US006536963B2

(12) United States Patent
Verhoest et al.

(10) Patent No.: US 6,536,963 B2
(45) Date of Patent: Mar. 25, 2003

(54) THERMAL PROCESSING OF A SHEET OF THERMOGRAPHIC MATERIAL

(75) Inventors: Bart Verhoest, Niel (BE); Luc De Coux, Heist o/d Berg (BE); Bart Verlinden, Tongeren (BE); Ludo Van Schepdael, Herent (BE)

(73) Assignee: Agfa-Gevaert (BE)

( * ) Notice: Subject to any disclaimer, the term of this patent is extended or adjusted under 35 U.S.C. 154(b) by 0 days.

(21) Appl. No.: 09/874,810

(22) Filed: Jun. 5, 2001

(65) Prior Publication Data

US 2002/0031356 A1 Mar. 14, 2002

Related U.S. Application Data

(60) Provisional application No. 60/232,590, filed on Sep. 14, 2000, and provisional application No. 60/232,591, filed on Sep. 14, 2000.

(30) Foreign Application Priority Data

Jul. 27, 2000 (EP) ........................................... 00202681
Jul. 27, 2000 (EP) ........................................... 00202682

(51) Int. Cl.[7] ............................................... G03B 13/00
(52) U.S. Cl. ........................ 396/567; 396/575; 396/578
(58) Field of Search ................................ 396/567–570, 396/575; 355/27–29, 30; 219/216

(56) References Cited

U.S. PATENT DOCUMENTS 5,758,245 A * 5/1998 Matsuura et al. ........... 219/216
5,869,806 A 2/1999 Struble et al.
5,869,807 A * 2/1999 Struble et al. .............. 219/216
5,975,772 A * 11/1999 Imai et al. ................... 219/216
6,309,114 B1 * 10/2001 Torisawa et al. ............ 219/216

FOREIGN PATENT DOCUMENTS

JP 63071848 A 4/1988
JP 03023446 A 1/1991
JP 2000-347379 12/2000

OTHER PUBLICATIONS

Search Report for EP 00 20 2682 dated Jan. 2, 2001.

Search Report for EP 00 20 2681 dated Jan. 5, 2001.

* cited by examiner

*Primary Examiner*—D Rutledge
(74) *Attorney, Agent, or Firm*—Leydig, Voit & Mayer, Ltd.

(57) ABSTRACT

A method for thermally processing a sheet of a thermographic material provides good flatness and dimensional stability together with a high optical homogeneity. The method incorporates the steps of supplying a sheet of thermographic material m (1) to a thermal processor (10) having a processing chamber (12), heating the processing chamber to a predetermined processing temperature, and transporting the sheet of thermographic material through the processing chamber in a sinuous way (4). This transporting is carried out by a first drivable belt (21), a second drivable belt (22) and backing means (27).

5 Claims, 9 Drawing Sheets

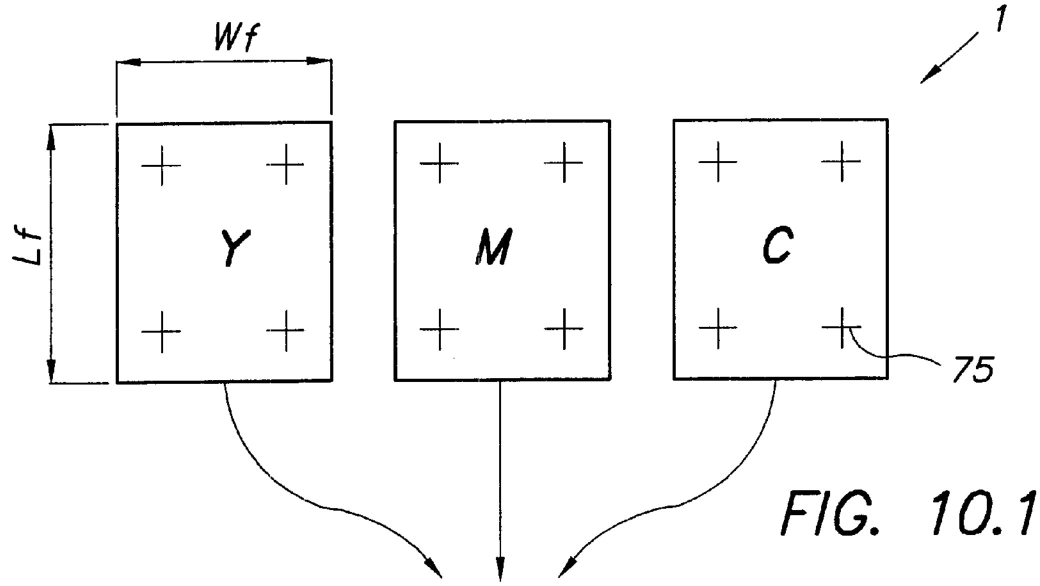
FIG. 10.1
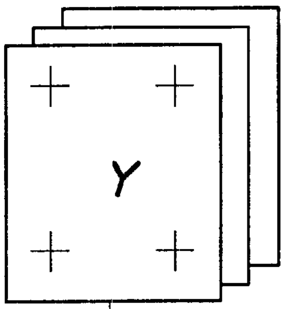
FIG. 10.2
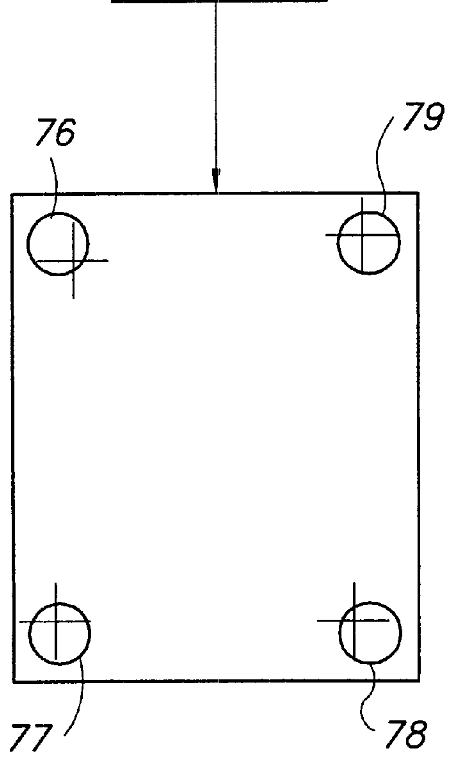
FIG. 10.3

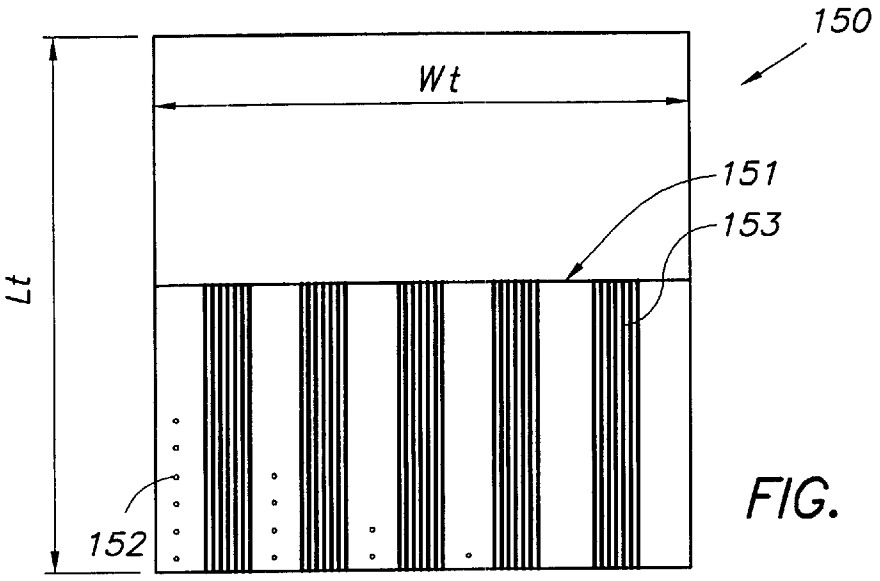
FIG. 12.1
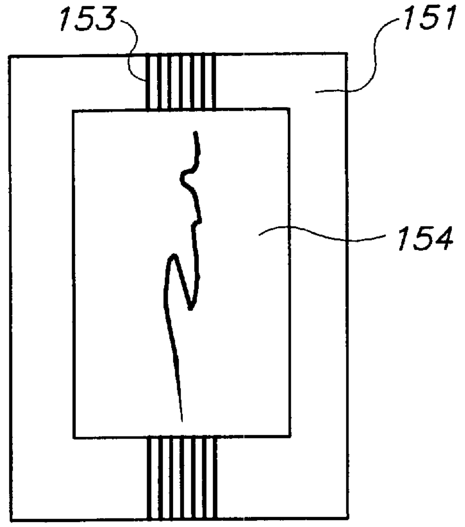
FIG. 12.2
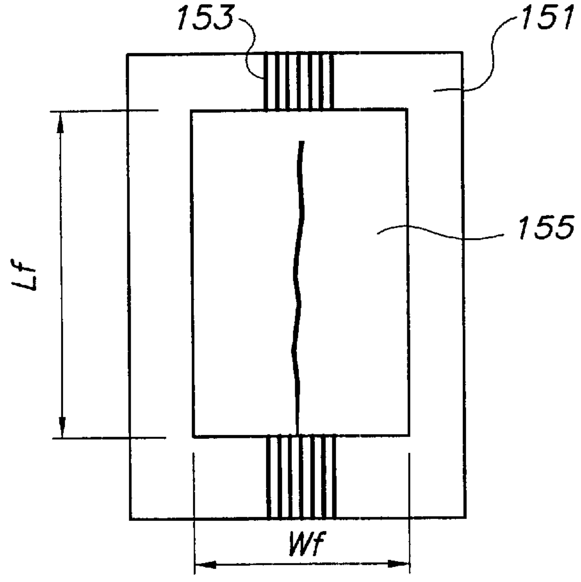
FIG. 12.3

THERMAL PROCESSING OF A SHEET OF THERMOGRAPHIC MATERIAL

CROSS REFERENCE TO RELATED PATENT APPLICATIONS

This patent application is a non-provisional application claiming the benefit of co-pending U.S. Provisional Patent Application No. 60/232,590, filed Sep. 14, 2000 and No. 60/232,591, filed Sep. 14, 2000. This patent application further claims priority to EP Patent Application Nos. 00202681.3 and 00202682.1, each of which was filed on Jul. 27, 2000.

FIELD OF APPLICATION OF THE INVENTION

This invention relates to a method and an apparatus for processing a sheet of a thermographic material, in particular an imaged sheet of a photothermographic material. Applications comprise medical fields (e.g., diagnosis) as well as graphical fields (e.g., four-color printing).

BACKGROUND OF THE INVENTION

Thermally developable silver-containing materials for making images by means of exposure and then heating are referred to as photothermographic materials and are generally known (e.g., "Dry Silver®" materials from Minnesota Mining and Manufacturing Company). A typical composition of such thermographically image-forming elements contains photosensitive silver halides combined with an oxidation-reduction combination of, for example, an organic silver salt and a reducing agent therefore. These combinations are described, for example, in U.S. Pat. No. 3,457,075 (Morgan) and in "Handbook of Imaging Science" by D. A. Morgan, ed. A. R. Diamond, published by Marcel Dekker, 1991, page 43.

A review of thermographic systems is given in the book entitled "Imaging systems" by Kurt I. Jacobson and Ralph E. Jacobson, The Focal Press, London and New York, 1976, in Chapter V under the title "Systems based on unconventional processing" and in Chapter VII under the title "Photothermography".

Photothermographic image-forming elements are typically imaged by an imagewise exposure, for example, in contact with an original or after electronic image processing with the aid of a laser, as a result of which a latent image is formed on the silver halide. Further information about such imagewise exposures can be found in EP 810 467 A (to Agfa-Gevaert N.V.).

In a heating step which then follows, the latent image formed exerts a catalytic influence on the oxidation-reduction reaction between the reducing agent and the nonphotosensitive organic silver salt, usually silver behenate, as a result of which a visible density is formed at the exposed points. Further information about the thermographic materials can be found, for example, in the above mentioned patent EP 810 467 A.

The development of photothermographic image-forming elements often poses practical problems. A first problem is that heat development causes a plastic film support to deform irregularly, losing flatness.

A second problem is that heat development often degrades dimensional stability. As the developing temperature rises, plastic film used as the support undergoes thermal shrinkage or expansion, incurring dimensional changes. Dimensional changes can result in wrinkling. Moreover, such dimensional changes are especially undesirable in preparing printing plates, because color shift and noise associated with white or black lines may appear in the printed matter.

In the prior art, many solutions for this dimensional problem have been disclosed, comprising the use as a support of a material which experiences a minimal dimensional change at elevated temperatures. All of these materials have their disadvantages (e.g., solvent crazing, low transparency in ultra-violet (UV), high cost, etc.)

For example, EP 0 803 765 (to Fuji Photo Film) discloses a specially prepared type of polycarbonate, having high transparency and light transmission in the UV region, recommended as a printing plate film support, and EP 0 803 766 (to Fuji Photo Film) discloses a photothermographic material comprising a support in the form of a plastic film having a glass transition temperature of at least 90° C.

JP 08211 547 (to 3M) describes a special type of thermographic material is disclosed which is made dimensionally stable by a specific heat treatment of the polymer support.

Among the polyesters, poly-ethylene-terephthalate (PET) is a widely used and inexpensive material. However, it is not dimensionally stable at elevated temperatures. Dimensional stability of PET can be improved by a thermal stabilization, thus rendering a thermally stabilized poly-ethylene-terephthalate film.

In "Plastics Materials", 4th edition by J. A. Brydson, Butterworth Scientific, 1982, pp. 649–650, thermal stabilization of a poly-ethylene-terephthalate film PET is described. Also C. J. Heffelfinger and K. L. Knox, in "The Science and Technology of Polymer Films" Volume II, edited by Orville J. Sweeting, Wiley-Interscience, New York, 1971, pp. 616–618, describes thermal stabilization of PET by heat setting.

U.S. Pat. No. 2,779,684 (to Du Pont de Nemours) discloses a polyester film with improved dimensional stability that does not show any significant shrinkage when exposed to a temperature of 120° C. for five minutes under conditions of no tension.

As one can see from the above, many solutions to the problem of dimensional stability have been disclosed which relate to the photothermographic material itself or to its support, or to a special method of preparation. However, in practice, such heat setting produces sheets which still deform too much during thermal processing of an imaged sheet.

Belt- & drum-processors, as disclosed, i.e., in U.S. Pat. No. 5,975,772 (to Fuji Photo Film), may provide a good temperature homogeneity, but they do not allow to process a thermographic material reaching a dimensional stability that is sufficient for e.g., 4-color-printing.

In WO 97/28488 and in WO 97/28489 (both to 3M), a thermal processor is disclosed which comprises an oven and a cooling chamber, more particularly a two-zone configured oven and a two-section configured cooling chamber.

This two-zone configuration results in uneven physical and thermal contact. Indeed, in the second zone of this oven, processing heat is transmitted to the upper side of the photothermographic material by convection, whereas processing heat is transmitted to the lower side of the photothermographic material both by conduction and by convection, which results in a degree of thermal asymmetry in the heating of the two sides of the photothermographic material. By consequence, for some highly sensitive kind of photothermographic materials the imaging quality may decrease, e.g., density unevenness may appear.

Moreover, film transport by means of rollers as disclosed e.g., in WO 97/28488 and in WO 97/28489 has further disadvantages: (i) due to a thermal discharge or unload of the roller, a repetition mark (comprising a mark per revolution of a roller) or a troublesome pattern is perceptible on the photothermographic material, (ii) in case of dust particles or flaws being present on a roller, repetitive pinholes appear on the thermographic material, (iii) automatic-cleaning of the apparatus-rollers is rather difficult to achieve; and (iv) jams of photothermographic material occur more frequently and are less easy to solve.

In summary, the prior art still needs a solution to the problem of dimensional stability of the photothermographic material while thermally processing.

The present application presents an alternate thermally processing with good dimensional stability and without undesirable density differences.

In particular, the present invention does not need a complicated photothermographic material, nor a special method of preparation for the photothermographic material.

The object of this invention is to provide a method for thermally processing a thermographic material with improved dimensional stability. Other objects and advantages of the present invention will become clear from the detailed description, drawings, examples and experiments.

SUMMARY OF THE INVENTION

We have discovered that these objectives can be achieved by using a method for thermally processing a sheet of a thermographic material m, comprising the steps of supplying a sheet of a thermographic material having an imaging element le to a thermal processor having a processing chamber, heating the processing chamber to a predetermined processing temperature Tp, transporting the sheet through the processing chamber, exporting the sheet out of the thermal processor such in that the transporting of the sheet through the processing chamber is carried out in a sinuous way by transporting means comprising a first belt and a second belt, wherein during the transporting of the sheet through the processing chamber, the first belt is in contact with a first side of the sheet and the second belt is in contact with a second side of the sheet, opposite to the first side.

BRIEF DESCRIPTION OF THE DRAWINGS

While the present invention will hereinafter be described in connection with preferred embodiments thereof, it will be understood that it is not intended to limit the invention to those embodiments.

FIG. 10 illustrates an empirical registration of intermediate films;

FIGS. 12.1–12.3 show evaluation templates usable for evaluating the flatness of a thermographic material.

DETAILED DESCRIPTION OF THE INVENTION (i) Terms and definitions

For the sake of clarity, the meaning of some specific terms applying to the specification and to the claims are explained before use.

The term "thermographic material" (being a thermographic recording material, hereinafter indicated by symbol m) comprises both a thermosensitive imaging material (being substantially light-insensitive, and often described as a 'direct thermographic material') and a photosensitive thermally developable imaging material (often described as heat-developable light-sensitive material, or as an 'indirect thermographic material', or a 'photothermographic material').

In the present specification, a thermographic imaging element le is a part of a thermographic material m (both being indicated by ref. no. 1). In the present application the term thermographic imaging element will mostly be shortened to the term imaging element.

"Laserthermography" means an art of direct thermography comprising a uniform preheating step not by any laser and an imagewise exposing step by means of a laser.

A "conversion temperature or threshold" is defined as being the minimum temperature of the thermosensitive imaging material m necessary during a certain time range to cause reaction between the organic silver salt and reducing agent so as to form visually perceptible metallic silver.

In the present application, the term "recording on a thermographic material" comprises as well an imagewise exposing by actinic light (e.g., on a photothermographic material), as an imagewise heating by a thermal head (e.g., on a direct thermographic material) or by a laser (e.g., in laserthermography).

In the present application, the term "sinuous" is understood as comprising, at least partially, a serpentine or a sinuated or a tortuous or a wavy form. The term sinuous is not meant as a synonym to sinusoidal; sinuous does not necessarily coincide mathematically exact with a goniometric sinus.

(ii) Preferred Embodiments of a Method According to the Present Invention

Figure 1:
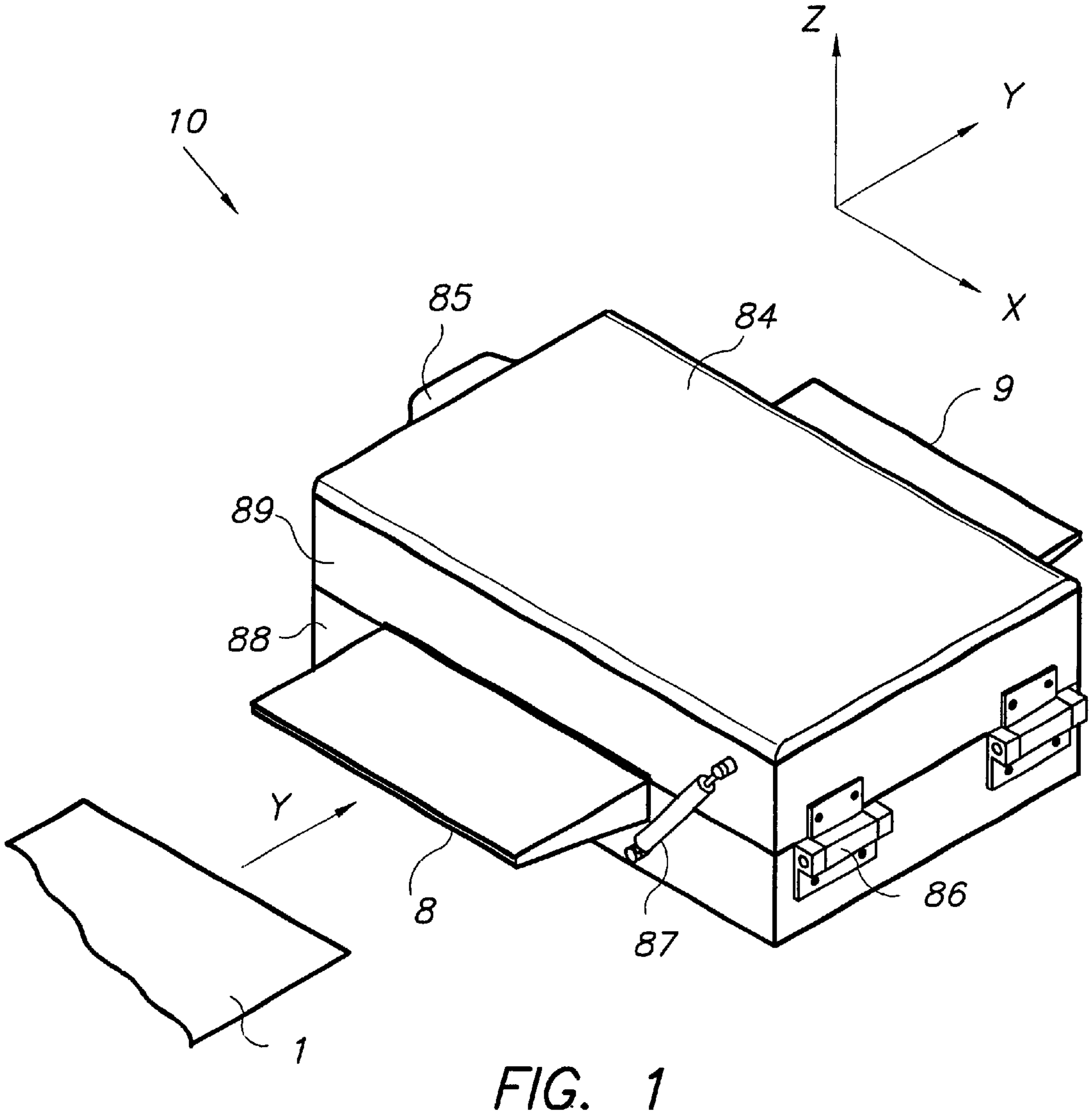
FIG. 1 is a pictorial view of a thermal processor according to the present invention.
Figure 4:
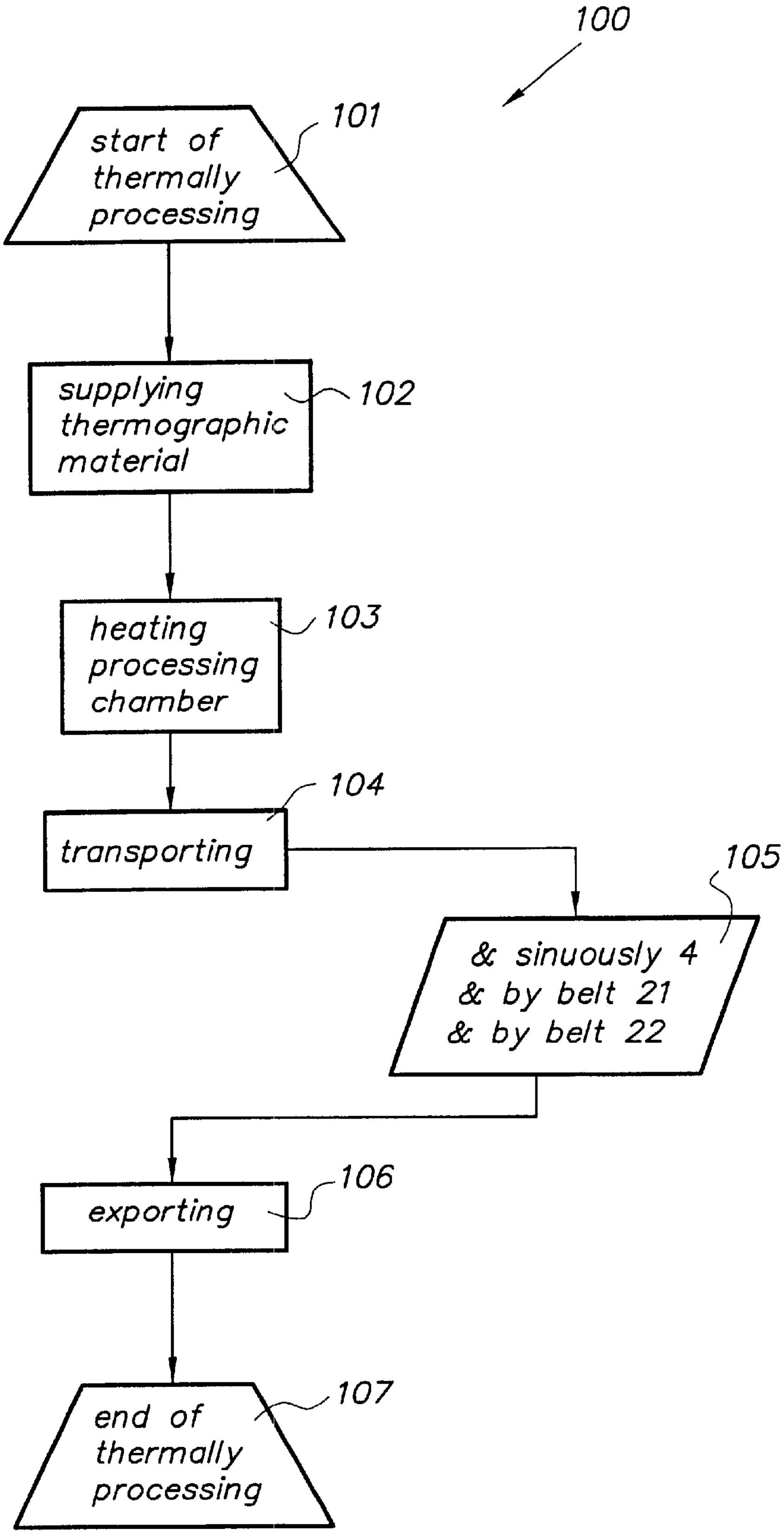
FIG. 4 is a flow chart showing an embodiment of a method for thermally processing according to the present invention.

FIG. 1 is a pictorial view of a thermal processor according to the present invention. FIG. 4 is a flow chart showing a method for a thermal processing according to the present invention. FIG. 1 presents a thermal processor 10 that comprises an apparatus frame having a lower frame 88 and an upper frame 89 that are connected to each other by means of hinges 86 and which can be opened by means of a handle 85 fastened on a cover 84. Piston mechanism 87 facilitates the opening and closing of the processor. A thermographic material 1 can be introduced via an input tray 8 into the processor, and leave via output tray 9. Arrow Y indicates the transport direction of the thermographic material through the thermal processor, sometimes also called subscanning direction or slowscan direction. Sheets of thermographic material (being mostly a thermographic film) 1 can be processed by feeding them into the entrance. If an attempt is made to insert the thermographic material 1 into the entrance, a transport-in sensor (not shown) may detect the attempt and drives the thermal processor 10.

The dwell time of the sheet within the processor 10 (i.e., the speed at which the belts are driven versus the length of the transport path) and the temperature within the processor are optimized to properly process the sheet. These parameters will, of course, vary with the particular characteristics of the sheet being processed.

The processor preferably also comprises a display means (not illustrated) for outputting a visual display of the status of the thermal processor. By doing so, a system operator is able to determine whether a sheet is being processed, whether the processor is ready to process another sheet or whether the processor is not yet ready to receive another sheet.

For the ease of further references, FIG. 1 also indicates three perpendicular axes, being a transversal direction X, a transport direction Y, and a vertical direction Z. Transversal direction X is also called mainscanning direction, or fastscan direction.

The present invention discloses a method for thermally processing (FIG. 4, ref. nos. 101 to 107) a thermographic material 1, comprising the steps of supplying (ref. no. 102) a thermographic material having an imaging element le to a thermal processor 10 having a processing chamber 12, heating (ref. no. 103) the processing chamber to a predetermined processing temperature Tp, transporting (see ref. no. 104) the thermographic material through the processing chamber and exporting (see ref. no. 106) the thermographic material out of the thermal processor. Herein the transporting the thermographic material through the processing chamber is carried out (see ref. no. 105) in a sinuous way 4 by transporting means comprising at least a first belt 21 and a second belt 22.

More precisely, according to the present invention, a method for thermally processing a sheet of a thermographic material 1, comprises the steps of a) supplying 102 a sheet of a thermographic material 1 having an imaging element le to a thermal processor 10 having a processing chamber 12, b) heating 103 the processing chamber to a predetermined processing temperature Tp, c) transporting 104 the sheet through the processing chamber, and d) exporting 106 the sheet out of the thermal processor, characterized in that the transporting of the sheet through the processing chamber is carried out 105 in a sinuous way 4 by transporting means comprising a first belt 21 and a second belt 22, wherein during the transporting of the sheet through the processing chamber, the first belt 21 is in contact with a first side 6 of the sheet and the second belt 22 is in contact with a second side 7 of the sheet, opposite to the first side.

In a more preferred embodiment of the present invention, during the transporting of the sheet through the processing chamber, the sheet contacts the belts 21, 22 in an alternating way so that at any given time a part of the sheet is at most in contact with only one of the first belt 21 and the second belt 22.

It may be clear that a sheet of thermographic material does not contact the first and second belt at the same time, nor is nipped between these belts. On the contrary, the sheet of thermographic material contacts the belts in an alternating way. It follows a sinuous path 4, but never is clamped or squeezed or nipped between two belts.

A further preferred embodiment of a method according to the present invention comprises the step of supporting each of the first and second belts by at least one backing means (which then could be illustratively added to step 105 in FIG. 4).

A still further preferred method comprises the step of heating the backing means.

Preferably the method comprises the steps of sensing 121 the presence of a thermographic material in the input section or in the processor, and activating the heating elements such that each belt temperature is controlled within a working range, preferably between 60 and 180° C., more preferably between 90 and 135° C. and more preferably between 100 and 130° C.

It can be understood from the accompanying drawings (e.g., FIG. 2) and the corresponding description that the thermographic material m is heated as soon as it enters the thermal chamber 12. A first heating of the thermographic material thus begins as soon as the leading edge of the material leaves the first sealing means 38 in the incoming thermally isolated wall 37, even before contacting a belt on a driving roller (being, in FIG. 2, the lower belt on the first lower driving roller 25). A substantial heating of the thermographic material occurs while contacting, at least partially, at least one of the first belt and the second belt.

It may be underscored that the homogeneity of the temperature in the processor reaches a very high level, because of several precautions which all will be disclosed within this description. Now, particular attention is focused on an important advantage delivered by the use of moving belts 21 and 22. Indeed, even if there were any temperature difference at any place within the processor, it would immediately disappear because the movement of the first belt 21 and the second belt 22, induces an important transportation of mass throughout the whole processor.

Next, particular attention is focused on the temperature Tm of the sheet of thermographic material m while processing. This temperature Tm of a sheet is determined by the temperature of a belt 21, 22 in contact, which temperature itself is controlled to be constant and independent of any previous contact. This advantage is obtained by the following means: (i) selecting an appropriate thermal capacity for the belts 21, 22 and an appropriate thermal capacity or thermal source for a backing means 27; and (ii) controlling the contacting length between a sheet of thermographic material 1 and the belts 21, 22. Quantitative results of practical experiments confirm the homogeneity of the temperature in the processor.

In some preferred embodiments, the transporting the thermographic material through the processing chamber is carried out during a predetermined processing time, e.g., ranging between 3 and 40 seconds, more preferably between 7 and 20 seconds, most preferably between 10 and 15 seconds.

Figure 2:
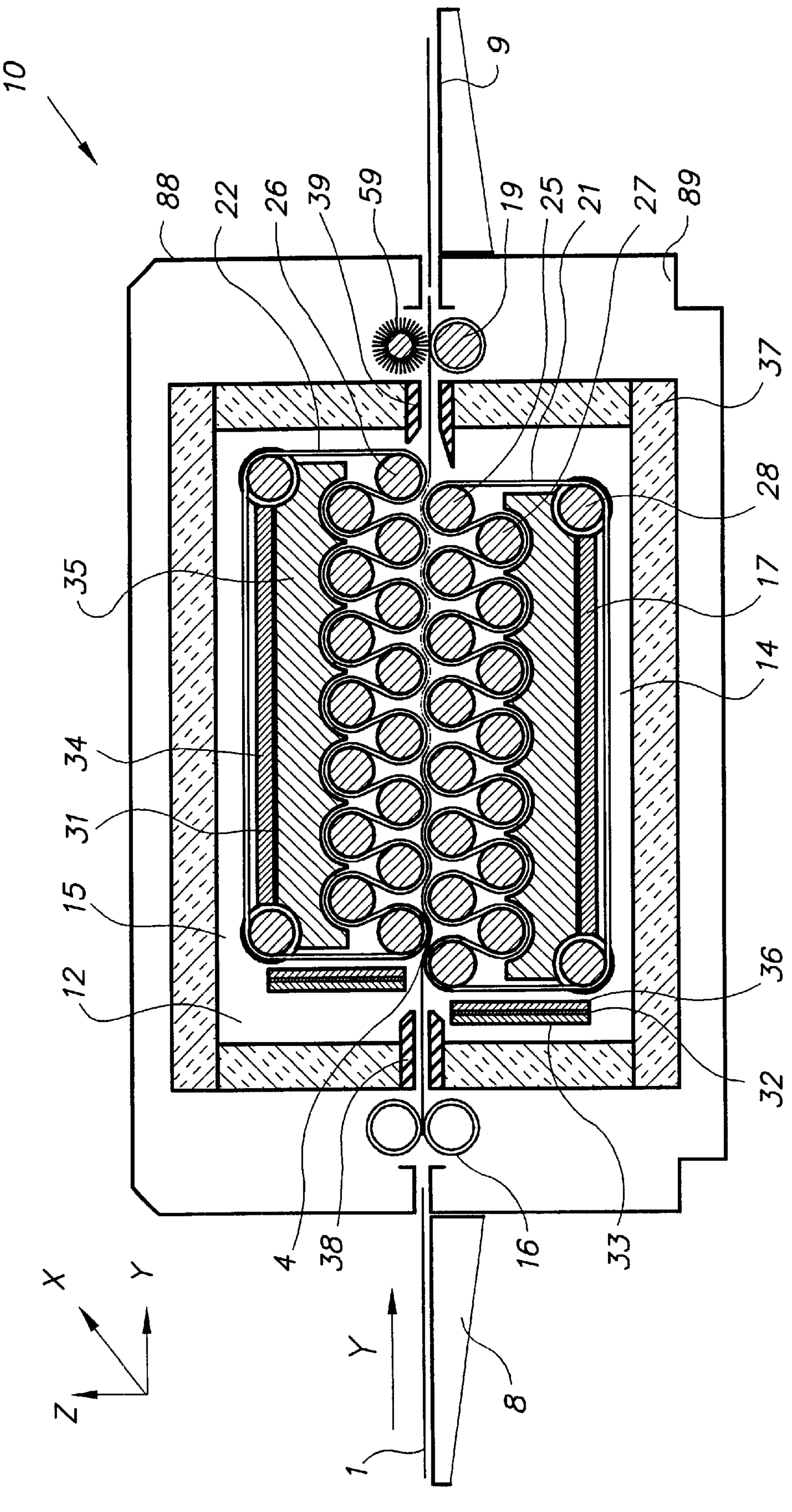
FIG. 2 is a cross-section of one embodiment of a thermal processor according to the present invention.

(iii) Preferred Embodiments of a Thermal Processor According to the Present Invention FIG. 2 illustrates a cross-section of a preferred embodiment of an apparatus in accordance with the present invention. Specifically, there is shown an apparatus 10 including a plurality of pairs of rollers—including driving rollers and idler rollers—, two flexible belts and backing means. Yet, FIG. 2 is a somewhat simplified view and does not really show all components of the apparatus for the sake of clarity. It should be noted that in addition to the components shown, e.g., various kinds of sensors may be provided as needed in the apparatus.

Moreover, an image recording system which uses thermographic material to produce prints or hard copies having a visible image formed in accordance with image data supplied from an image data supply source (not shown in FIG. 2) basically comprises, in the order of transport of the thermographic material 1 a thermographic material supply section (see e.g., input tray 8), an image exposing section (not shown in FIG. 2), a thermal processor 10, and a delivery section (cf. exit tray 9). In order to process the thermographic material properly, it is desirable to maintain close temperature tolerances. Thereto, various thermally insulated walls 37 (e.g., the bottom and upper walls, left and right walls, input and exit walls) are located within the processor chamber.

Preferably, the processing chamber 12 has a first part 14 and a second part 15 which are substantially equal, or symmetric or nearly symmetric (see e.g., FIGS. 2, 3, 5, 6, 12). By doing so, also the thermal impacts on a first side and on a second side of a sheet of thermographic materials are substantially equal. This also increases the feasibility in multi-color printing (e.g., 3-, 4- or 6-color).

Another advantageous consequence of a belt 21, 22 having no physical interruptions and being driven continuously comprises a maximum homogeneity of the optical density of the thermographic material. Amongst others, no repetition marks will be present. In case of using, for example, a roller-processor, a repetition mark per revolution of a roller could occur.

According to the present invention, a thermal processor 10 for thermal processing a thermographic material 1 comprises means for supplying 16 the thermographic material to the thermal processor, a processing chamber 12, means for heating 17 the processing chamber, means for transporting the thermographic material through the processing chamber, and means for exporting 19 the thermographic material out of the thermal processor. Herein, the means for transporting comprise a first belt 21 and a second belt 22 arranged with respect to the first belt so that transporting the material through the processing chamber is carried out in a sinuous way 4.

Figure 3:
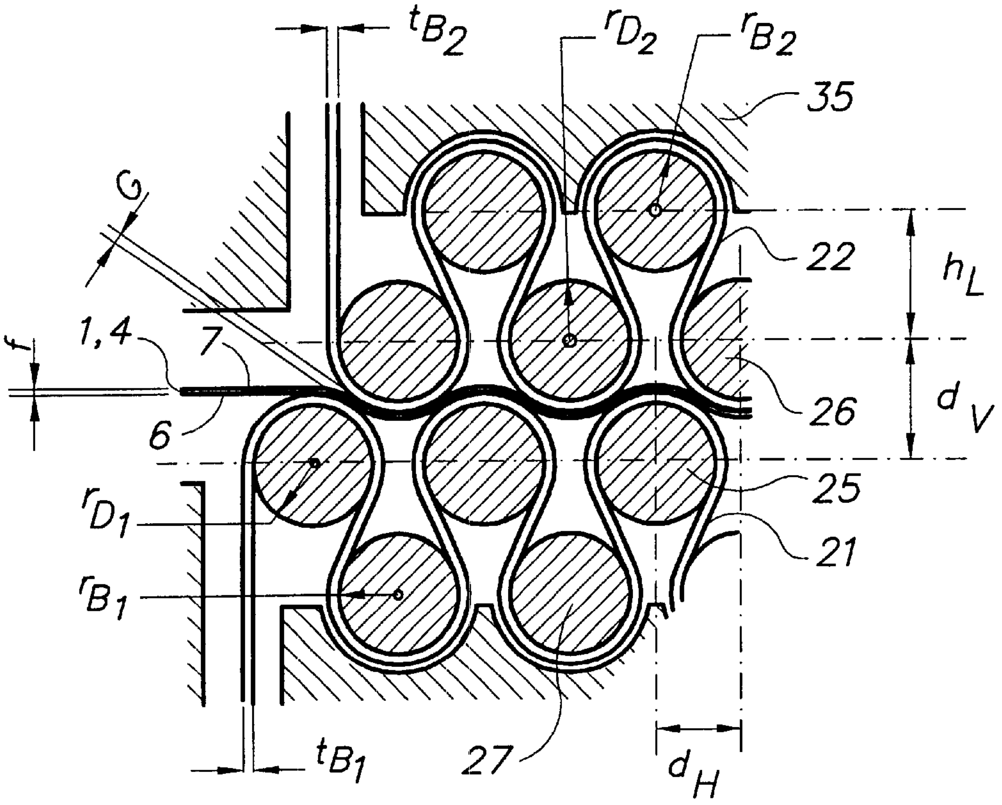
FIG. 3 is a partial sectional view of an embodiment of a thermal processor according to the present invention.

FIG. 3 is a partial sectional view of an embodiment of a thermal processor according to the invention. It may be clear from FIG. 2 and especially from FIG. 3 that the first belt 21 is conveying the thermographic material, at least partially, at a first side 6 of the thermographic material and that the second belt 22 is conveying the thermographic material, at least partially, at a second side 7 of the thermographic material.

Belts 21 and 22 move in a direction as indicated by arrow Y and are driven by various driving rollers 25–26. As shown in FIGS. 2 and 3, the lower driving rollers 25 and the upper driving rollers 26 are mounted for rotation on parallel axes. The driving rollers 25, 26 are so positioned as to force the belts 21, 22—and hence also the thermographic material 1—to follow a sinuous path 4 between the two sets of driving rollers. As the belts travel between the driving rollers, the thermographic material 1 is alternately displaced (nearly perpendicular to the direction Y of the belt), indicated as vertical direction Z. The deflection of the material 1, for example, by an upper driving roller 26, acting on the material 1 in opposition to the two nearest lower driving rollers (that are staggered) 25 causes the material 1 to assume a curve.

The belts are in close contact with the thermographic material, substantially without exercising a pressure thereupon, a nipping force does not act between them. Indeed, the thermographic material is handled in such a way that it follows a sinuous path but never is clamped or squeezed or nipped between two rollers or belts.

Thereto, the size of the gap G provided between the lower belt 21 and the upper belt 22 preferably is substantially equal to or greater than the thickness f of the thermographic material m. It suffices if the belts are capable of reliably transporting the thermographic material by imparting a transporting force to it. This force is influenced by the angle to the thermographic material, the rigidity of the thermographic material, and the like.

In this embodiment, a thermographic material in which the thickness of a base is, for example, 175 $\mu$m and the thickness of the emulsion layer is, for example, 20 $\mu$m may be used. For this reason, the dimension of the aforementioned gap G is at least 0.2 mm. That is, the arrangement provided is such that this gap G prevents a nipping force to be imparted to the thermographic material 1 which enters between the lower belt and the upper belt.

Even if the dimension of the gap is made 0.5 mm or even about 1 mm larger than the thickness f of the thermographic material m, the thermographic material can be transported smoothly by frictional resistance, and uneven processing does not occur in the thermographic material.

A preferred embodiment of a thermal processor 10 for thermal processing a sheet of a thermographic material having an imaging element Ie comprises: a) means for supplying 16 the thermographic material to the thermal processor, b) a processing chamber 12, c) means for heating 17 the processing chamber, d) means for transporting the sheet of thermographic material through the processing chamber, e) means for driving the means for transporting the sheet, and f) means for exporting 19 the thermographic material out of the thermal processor, wherein the means for transporting comprise a first belt 21 and a second belt 22 arranged with respect to the first belt so that transporting the sheet of thermographic material through the processing chamber is carried out in a sinuous way 4, and wherein the means for driving the means for transporting comprise at least one backing means for each of the belts.

Figure 6:
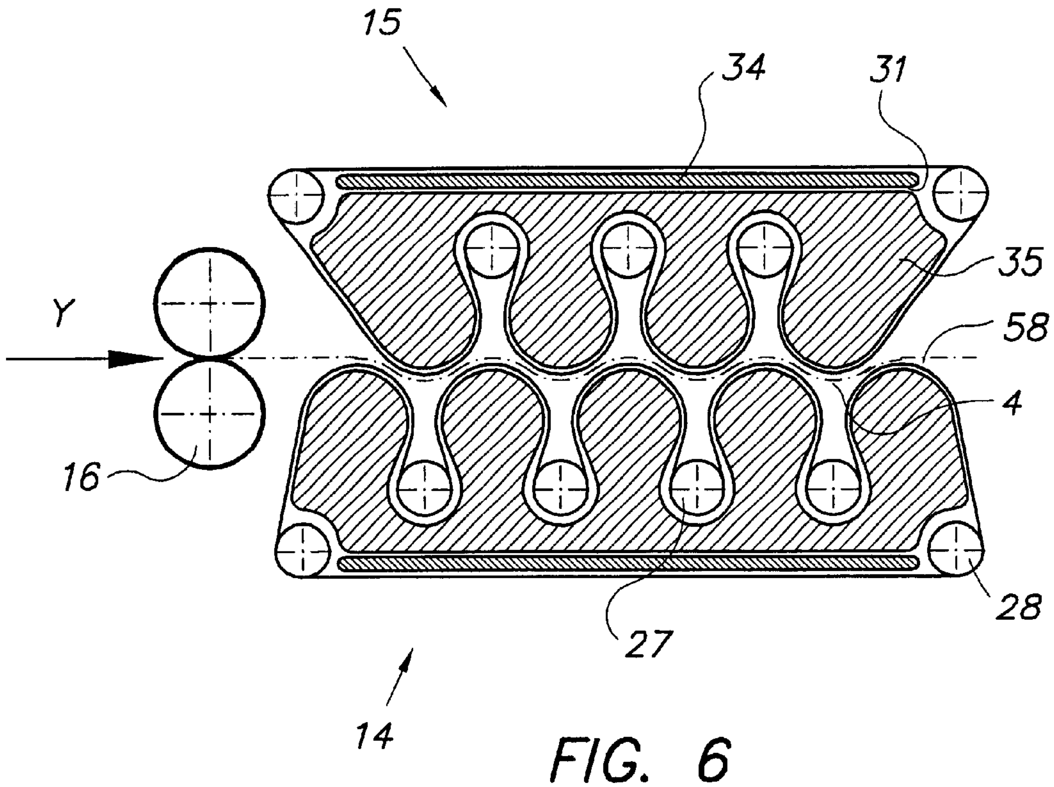
FIG. 6 is a sectional view of another embodiment of a thermal processor according to the present invention comprising backing rollers and stationary shoes.

The backing means could consist of rollers, as indicated in FIG. 3, but also (non-rotating) stationary shoes or other backing devices are possible backing means. FIG. 6 is a fragmentary sectional view of a thermal processor comprising backing means and stationary shoes. It is preferred that the means for driving the means for transporting further comprise means for driving the first and the second belt 21, 22 having at least one driving roller 25, 26 for each of the belts.

Figure 7:
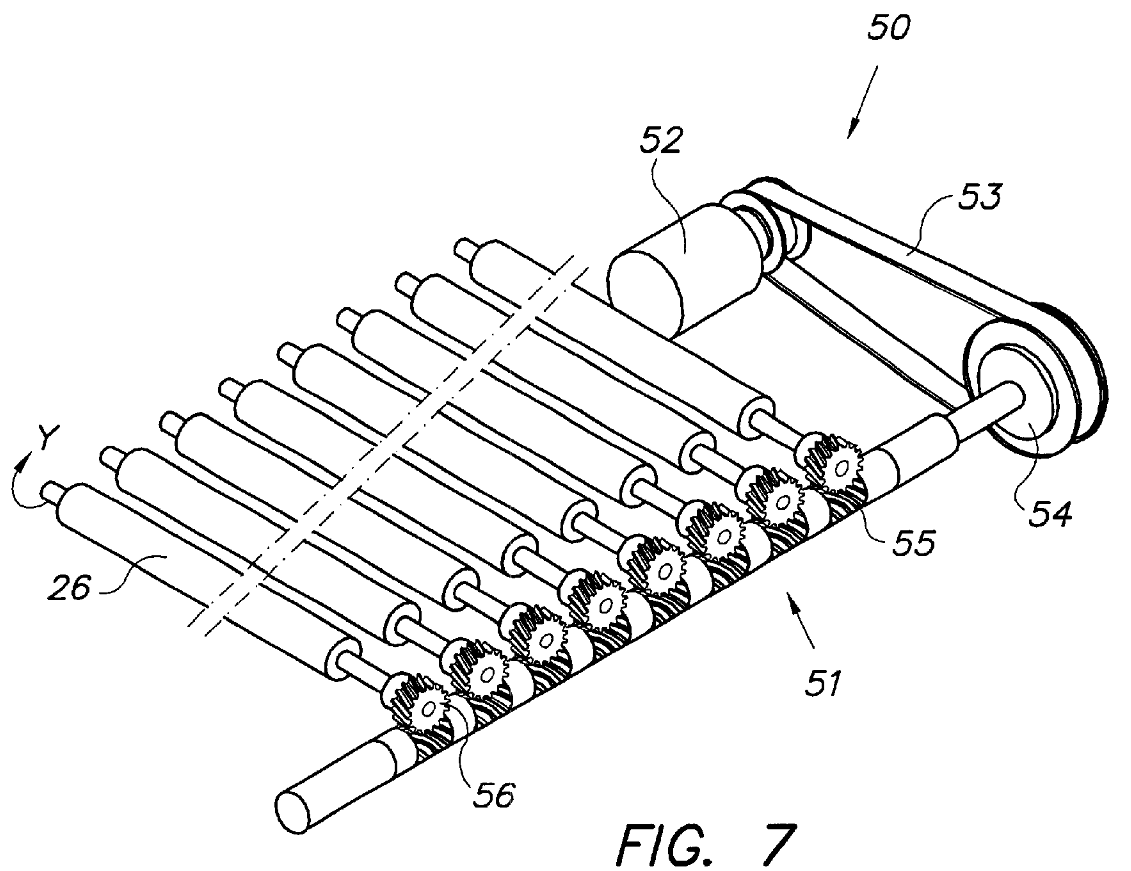
FIG. 7 is a perspective view showing means for driving the first and the second belt comprising a cascade free drive.

Preferably, the means for driving 50 the first and the second belt comprises a cascade-free drive 51, meaning that each roller 25–26 is separately driven, directly from a motor 52 and not from another roller. By this, possible errors in one of the rollers are not transmitted to other rollers. Thus, for example, possible speed differences are not multiplied, vibrations or shocks are not carried over from one roller to another roller. As an example, FIG. 7 shows a worm 55 driving several wormwheels 56, each mounted on one of the driving rollers 25–26. It will be clear that transmission 53, being illustrated as a flat belt between the motor 52 and a pulley 54, might be replaced by any other transmission (e.g., a V-shaped belt) which does not introduce any speed or vibration errors.

In a further preferred embodiment, the processor comprises means for driving the first and the second belt 21, 22 having at least two driving rollers 26 and at least one backing means for at least one of the belts.

Figure 5:
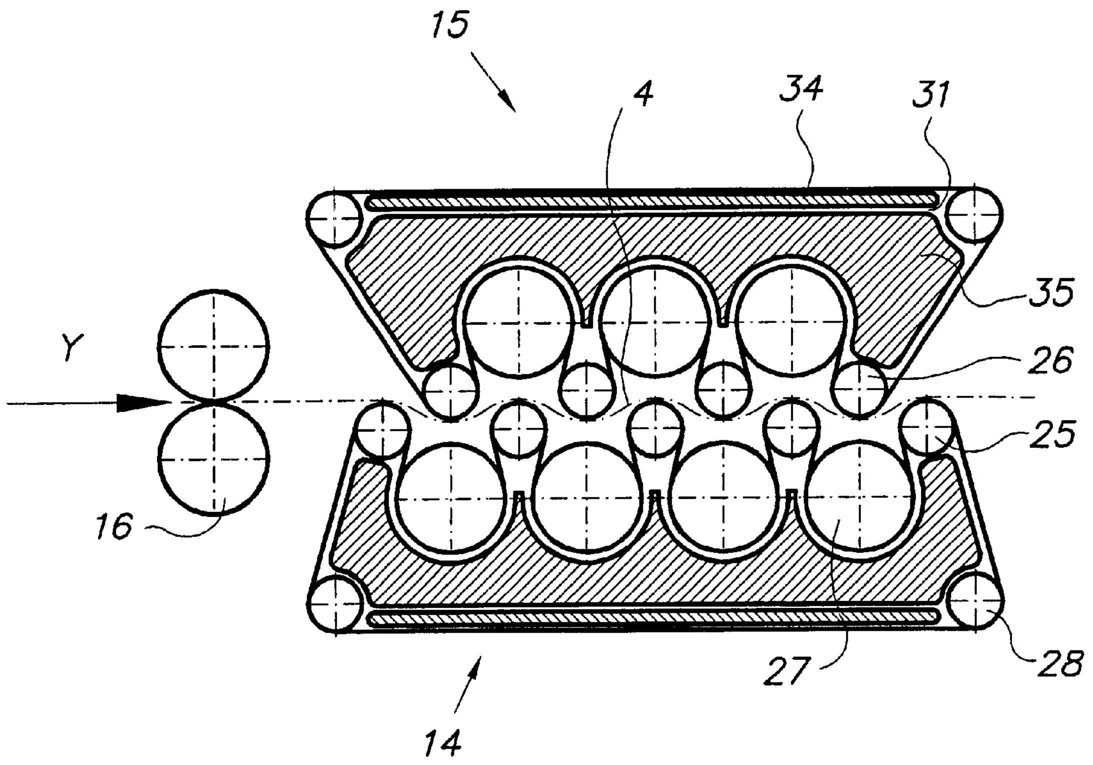
FIG. 5 is a sectional view of another embodiment of a thermal processor according to the present invention and comprising backing rollers being substantially thicker than the driving rollers.

In a further preferred embodiment of a thermal processor 10, the backing means comprises a backing roller 27, preferably at least one backing roller 27 for each of the belts (see FIGS. 2, 3 and 5).

Attention should be given to FIG. 5, which is a sectional view of another embodiment of a thermal processor according to the present invention. It comprises backing rollers 27 being substantially thicker than the driving rollers 25–26.

In a still further preferred embodiment, the backing roller is a heated backing roller (that will be described later on).

Having disclosed the driving system of the processor, attention has to be focused on the heating system of the processor. In particular, reference is made to FIGS. 2 and 8.

Figure 8:
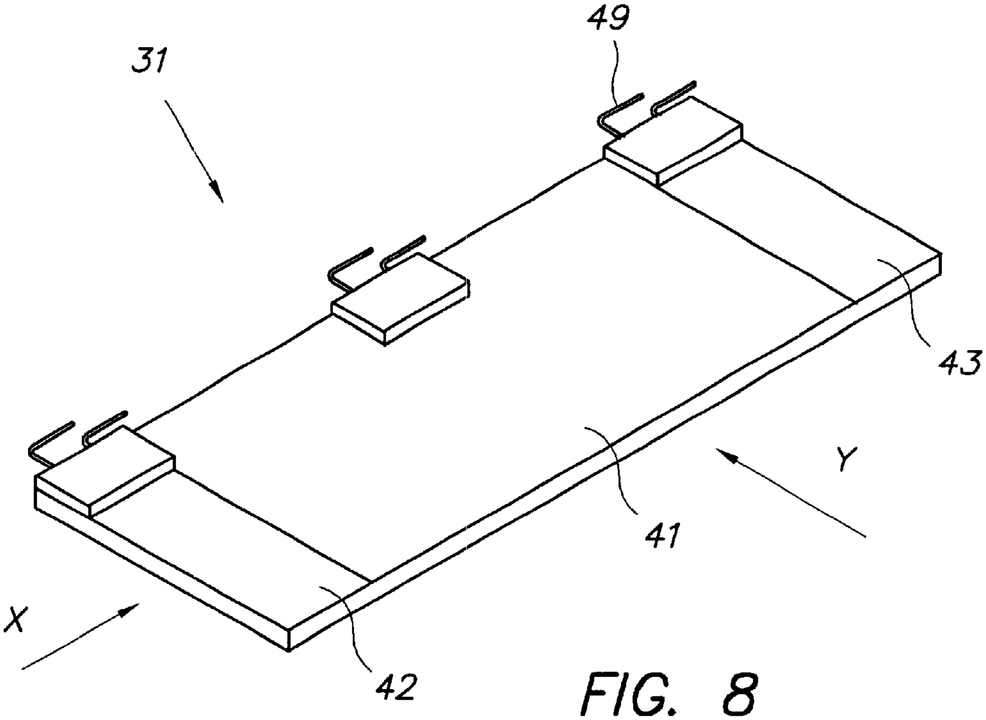
FIG. 8 is a perspective view of a heating element suitable for use in the present invention.

According to a further embodiment of the present invention, a means for heating 17 the processing chamber preferably comprises an electrically resistant heating element 31, shown in FIG. 8, and means for transmitting 34, 35 heat from the heating element to one of the belts, as shown in FIG. 2.

Preferably, at least two means for heating are disposed for heating the processing chamber 12, one heating means in the first (i.e., lower) part of the processing chamber 14 and one heating means in the second (i.e., upper) part of the processing chamber 15.

Moreover, preferably the heating means comprises at least two independently controlled temperature zones. More preferably, both the heating elements of the lower part of the chamber 14 as well as the heating elements of the upper part of the chamber 15 each comprise three independently controlled temperature zones, indicated by ref. nos. 41, 42, 43. Ref. no. 49 indicates the electrical connections to a heating element or to a zone of the heating element.

The temperature of each heater, and/or the temperature of each zone can be controlled by means of a suitable temperature sensor (not shown) and a temperature regulating controller (not shown) which affects the heat amount given to the thermographic material 1.

Preferably the electrically resistant heating element 31 has a power density ranging between 0.1 and 10 W/cm$^2$, more preferably between 0.5 and 2 W/cm$^2$.

In a preferred embodiment, the heating elements comprise flexible heaters, based on a silicone rubber, as available, e.g., from WATLOW™. The thickness of these flexible heaters preferably is in a range between 0.5 and 1.5 mm.

The temperature of the heating and the time for which thermal processing is to be performed are not limited to any particular values and may be determined as appropriate for the material to be used. The time of thermal processing may be adjusted by altering the transport speed of the material, generally by controlling the number of revolutions pro time of electromotor 52.

According to a further embodiment of the present invention, the processor 10 further comprises auxiliary means for heating 32 the processing chamber 12 and auxiliary means for transmitting 36 heat from the heating means to one of the belts, preventing any loss of energy by incorporating suitable isolation means 33. The auxiliary means for heating 32 comprises e.g., an electrically resistant heating element, or a bank of thermostatically controlled infrared heaters. Also this auxiliary means for heating 32 may comprise, for example, three independently controlled temperature zones (not shown separately).

The means for heating 17 and the auxiliary heating element 32 are not limited to any particular type. Possible heating means include a nichrome wire for resistive heating, a light source such as a halogen lamp or an infrared lamp, and a means for heating by electric induction in a plate or a roller.

In a particularly preferred embodiment, the at least one backing means is heated, indirectly or directly. Indirect heating of the backing means is carried out by, for example, an electrically resistant heating element 31 and by means for transmitting 35 heat (see FIGS. 2, 4 and 5). In another embodiment (not illustrated for sake of conciseness), direct heating of the backing means may be carried out by a separate heating of the backing means, e.g., by means of an infrared lamp intended for radiation heating or an electrical coil mounted within or nearby the backing means intended for induction heating.

In another embodiment, the means for heating 17 the processing chamber comprises both an electrically resistant heating element and an electrical heat radiator.

Preferably, the first belt and the second belt have a volumetric heat capacity below 2.5 kJ/K.dm$^3$. Herein, volumetric heat capacity is calculated as being the product of material density (e.g., in kg/dm$^3$) and specific heat capacity (e.g., in kJ/kg.K). Suitable materials comprise, e.g., elastomers of the kind ethylene/propylene/diene terpolymers EPDM.

Preferably, the first belt and the second belt have a heat conductivity or conductance lower than 0.3 W/K m. Suitable materials comprise, for example, elastomers of the kind ethylene/propylene/diene terpolymers EPDM.

A thermal processor according to the present invention preferably also comprises measuring means (not shown) for measuring the temperature of the processing chamber 12 in at least one place, preferably in the neighborhood of a belt, more preferably in the neighborhood of the thermographic material (not shown). In addition, the measured temperatures are converted into control signals for activating the heating means.

In order not to disturb the thermal balance within the processor, e.g., by any prohibitive air flow from the outside of the apparatus, thermal sealing at the input side and at the exit side of the processor is present. This sealing may be carried out by a first sealing means 38 and a second sealing means 39, e.g., four cushions of polyamide 100% Nylvelours™, being thermally resistant (e.g., up to temperatures of 150° C. during at least 10 hours).

The processor illustrated in FIG. 2, further may comprise a density control. Such density control incorporates a densitometer for measuring the optical density of the thermographic material m, preferably before thermal processing (hence, measuring the base density and possible fog) and after thermal processing (hence, measuring the print). More preferably, also an electronic feedback system in order to control these densities may be advantageous.

If dust or other foreign matter enters between the thermographic material 1 and one of the belts 21, 22, the thermographic material "floats" during thermal processing microscopically and the efficiency of heat transfer in the affected area decreases. As a result, the quantity of heat being imparted to the thermographic material by thermal processing varies from place to place and uneven densities occur due to unevenness in thermal processing.

Therefore, for sake of highest reliability and print-quality, even under severe conditions (such as high processing speed, huge volumes of prints, etc.) the processor also may comprise automatic cleaning means for the respective belts.

Focusing our attention now on the system for transporting the sheet through the processor (see FIG. 3), preferably the radius $r_D$ of a driving roller and the radius rB of a backing roller are in a range defined by following equations:

$$0{,}5.r_{Dj}<r_{Bj}<5.r_{Dj} \qquad \text{[eq.1]}$$

$$r_{Bj} \geq \frac{E \cdot F}{2 \cdot \sigma_y} - t_{Bj} \qquad \text{[eq. 2]}$$

$$r_{Dj} \geq \frac{E \cdot F}{2 \cdot \sigma_y} - t_{Bj} \qquad \text{[eq. 3]}$$

wherein E is the modulus of elasticity of the support layer of the thermographic material, $\sigma_y$ is the yield strength of the support layer of the thermographic material, f is the thickness of the thermographic material (e.g., film), j=1 for the lower part 14 of the processing chamber 12 and j=2 for the upper part 15 of the processing chamber 12. For example, $r_{B1}$ and $t_{B1}$ respectively relate to the radius of a backing roller and to the thickness of the belt of the lower part, whereas $r_{B2}$ and $t_{B2}$ respectively relate to the radius of a backing roller and to the thickness of the belt of the upper part. In some embodiments, it may be that $r_{B1}=r_{B2}$ and/or $t_{B1}=t_{B2}$. Preferably, E, $\sigma_y$ and f are measured at processing temperature Tp.

For sake of good understanding, it is mentioned that the numerical value of σy, generally called the 'yield strength' of the thermographic material, preferably is measured in accordance to the standards ASTM D 638 and ASTM D 882. More precisely, σy means the 'offset yield strength' of the thermographic material. Most preferably, the present specification relates to a polyester material exhibiting in the initial part of the stress-strain curve a region with a linear proportionality of stress to strain and σy indicates the '2% yield strength' or 'yield strength at 2% offset'. According to ASTM D 638, the 2% yield strength is the stress at which the strain exceeds by 2% (being 'the offset') an extension of the initial proportional portion of the stress-strain curve. It may be determined experimentally by suitable test equipment, as a tensile testing machine available from INSTRON™. The resulting numerical value is expressed in force per unit area, in megapascals (MPa), or optionally in pounds-force per square inch (psi).

In a further preferred embodiment, following relations between the radius $r_D$ of the driving rollers, the thickness $t_B$ of a belt and a horizontal center-distance $d_H$ are satisfied $$(r_{D_1}+r_{D_2}+t_{B1}+t_{B2})>d_H>1{,}05.r_{D1} \qquad \text{[eq.4a]}$$

and also $$(r_{D_1}+r_{D_2}+t_{B1}+t_{B2})>d_H>1{,}05.r_{D2} \qquad \text{[eq.4b]}$$

wherein j=1 for the lower part 14 of the processing chamber 12, and j=2 for the upper part 15 of the processing chamber 12. $R_{d1}$ relates to a driving roller of the lower part 14 of the processing chamber 12. Moreover, preferably $d_H$<25 mm., and more preferably $d_H$<20 mm. It applies in particular for a thermographic material based on a PET-film.

In a further preferred embodiment, following equation applies to the driving rollers $$\sqrt{(r_{D_1}+r_{D_2}+t_{B1}+t_{v2}+f)^2-d_H^{\,2}}<d_V<(r_{D_1}+r_{D_2}+t_{B1}+t_{B2}) \qquad \text{[eq.5]}$$

As an example, one embodiment applies: E=1 GPa for a 0.175 mm PET-based film at about 393 K (or +120° C.); with a $\sigma_y$=10 MPa at 393 K, a thickness $t_B$ common for both belts with $t_B$=1.5 mm, resulting in $r_D$ and $r_B$ both being at least 7.25 mm.

In a preferred embodiment, the driving rollers 25, 26 have a ratio (ϕ/Lr) of the maximum diameter ϕ of the roller to the length Lr thereof being sufficient stiff to avoid wrinkling of the thermographic material.

Next, the driving rollers 25–26 and the backing rollers 27 are made of a material having an elasticity above 60 GPa, e.g., comprising steel or stainless steel.

It may be evident for the people skilled in the art that in a processor according to the present invention the first belt and the second belt follow at least partly a sinuous path. Indeed, as seen, for example, in FIG. 2 or FIG. 3, each of the belts may follow a partly linear path (especially between a driving roller 26 and a backing roller 27), and a partly circular path (e.g., a semicircle around a driving roller 26 or around a backing roller 27).

It has to be emphasized that many properties (such as thermal conductivity and thermal capacity) of both belts preferably should be isotrope or quasi-isotrope both in the transport-direction Y and in the transversal-direction X. Further, it is highly preferred that in each point, having arbitrary co-ordinates X and Y on each belt, which could be in contact with the thermographic material should have equal or quasi-equal properties (such as thermal resistance) in the vertical direction Z.

In a highly preferred embodiment, each belt is operated under a prestretch caused by an enforced expansion of the belt in a range between 1 and 5%, preferably about 2% of its nominal length. This can be carried out by displacement of a bending part, e.g., by displacement of an edge roller 28, 29.

The belts are preferably formed of a material selected from silicone rubber such as Silicon R (trademark of Wacker) or Silopren (trademark of Bayer), polyurethane (PUR) such as 'Esband' (available from Max Schlaterer GmbH, Germany), acrylat-elastomere ACM such as Cyanacryl (trademark of Cyanamid), ethylene/propylene polymers EPM and ethylene/propylene/diene terpolymers EPDM such as Epcar (trademark of Goodrich) or Keltan (trademark of DSM), nitrile-butyl rubber NBR such as Butacril (trademark of Ugine Kuhlmann) or Perbunan (trademark of Bayer), and fluor rubber such as Viton (trademark of Du Pont) or Technoflon (trademark of Montedison).

Other materials suitable for the belts, comprise textile (e.g., Nomex, trademark of Du Pont) or some specific materials selected from stainless steel, non-ferrous alloys (as aluminum, copper), nickel, titanium and composites thereof.

In a further preferred embodiment, the belts 21 and 22 comprise "Esband EPDM GRUEN", with a thickness $t_B$ of 2 mm.

Figure 9:
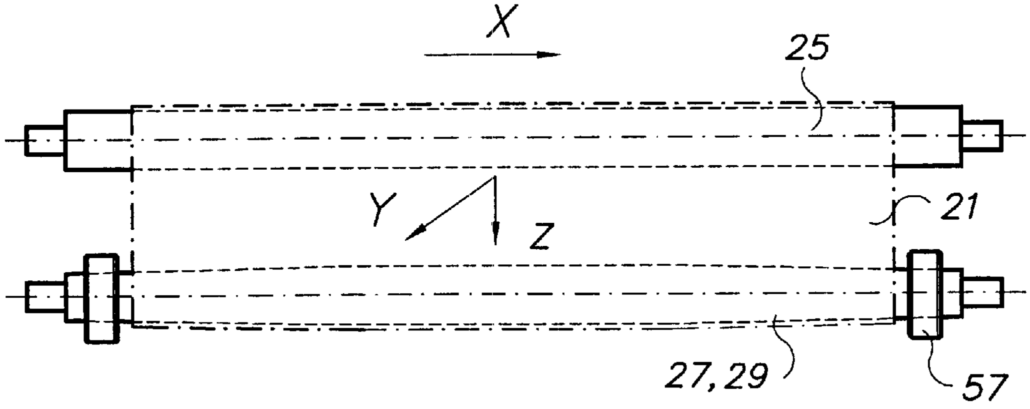
FIG. 9 is a partial view of a belt, a driving roller, and a backing roller being crowned and flanged according to the present invention.

Belt guidance is, for example, carried out by the use of crowned rollers 29, having a greater diameter in the middle than at the edges (see FIG. 9). Preferably, at least some of the backing rollers 27 are crowned rollers. Moreover, backing rollers 26 may be idler rollers, being driven or not driven. Also, some of the edge rollers 29 may be idle and/or crowned. Further, belt guidance may be sustained by means of flanges 57 at one or two ends of some rollers.

Alternatively, belt guidance can be achieved by all other means of active steering, consisting of sensing the position of the belt, and steering one or more roller positions in order to control the position of the belt within acceptable limits. One way is for instance to install one bearing of roller 28 in a slot, allowing to shift it forward or backward, and in this way to guide the belt.

Preferably the first belt and the second belt have an average surface finish better then 3.2 μm Ra or CLA, more preferably better then 0.8 μm.

In order to achieve an error-free processing of the material within the thermal processor (e.g., no wrinkles, no slippage, no smearing or material transfer), the distance and the angle of the upper part 15 of the chamber 12 preferably are adjusted relative to the lower part 14 of the chamber 12. In a preferred embodiment, this leveling is realized by means of three controlling mechanisms, e.g., comprising 3 studs or screws (not shown).

For sake of clarity, although all drawings of the present invention illustrate a generally horizontal path, a vertical path, an oblique path or an arcuate path is also possible (but not shown).

(iv) Comparative Experiments

As mentioned in the background section of the present invention, thermal development of photothermographic image-forming materials often causes a plastic film support to deform irregularly, thus losing flatness. According to the instant object, the present invention discloses thermally processing a thermographic material with improved dimensional stability.

Comparative experiments sustain this object. These experiments are disclosed in five paragraphs relating to (1) an empirical evaluation of homogeneity of temperature in a thermal processor, (2) an empirical evaluation of flatness of a thermographic material, (3) an empirical evaluation of optical homogeneity of a processed thermographic material, (4) an empirical evaluation of geometrical spread in optical homogeneity of a processed thermographic material, and (5) an empirical evaluation of registration monitoring of a processed thermographic material.

(1) Empirical evaluation of homogeneity of temperature in a thermal processor

First, tests for evaluating the effect of the belts on homogeneity of temperature in a processor according to the present invention are described. In the processor, temperature measurements were done on different locations (say A, B, C). All measurements took place at a vertical level (Z) between first part 14 and second part 15 of the processing chamber 12 (see FIG. 2), at transversal positions (X) situated in different zones, and in transport direction (Y) at different positions (near the entrance, in the mid and near the exit). The heating system of the processor was turned on, and the temperatures were recorded after reaching a steady state.

The temperature measurements were done in two conditions: in a first test, the motor 52 that drives the belts 21–22 was turned on, and thus the belts were moving; in a second test, the motor was turned of, and thus the belts were stopped.

The following tables show the temperatures that were recorded in these cases.

| | A | B | C |
|---|---|---|---|
| Belt in motion | 123.8° C. | 124.° C. | 123.3° C. |
| Belt stopped | 123.8° C. | 110.6° C. | 111.2° C. |

These two tables illustrate clearly that the movement (in transport direction Y) of the belts has a positive influence on the homogeneity of temperature in the processor. It is clear that imperfections in homogenous heating, and imperfections in insulation, are compensated by the movement of the belts.

(2) Empirical evaluation of flatness of a thermographic material

Figure 11:
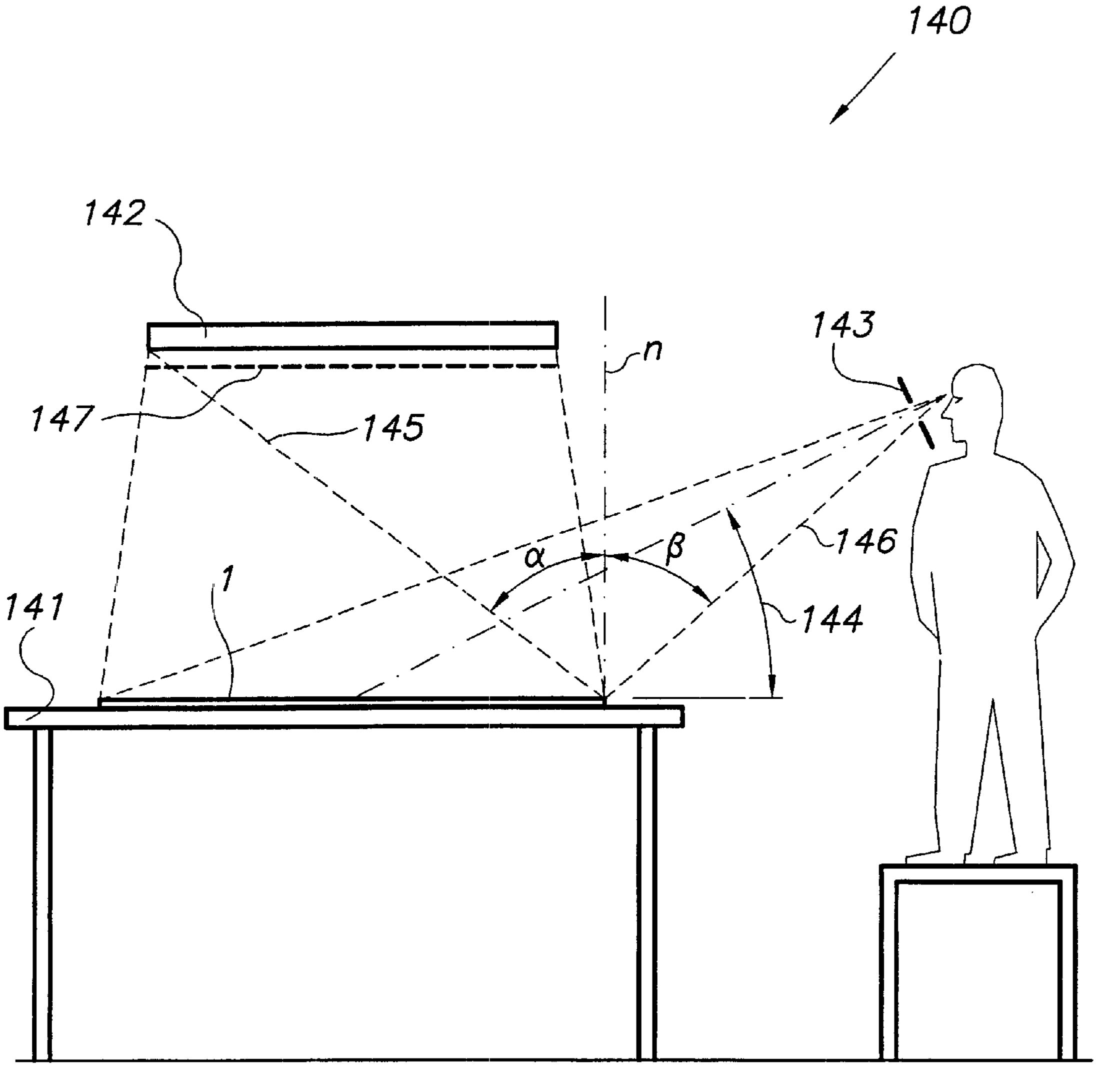
FIG. 11 shows a test equipment for evaluating the flatness of a thermographic material.

Tests for evaluating the flatness or planeness of a thermographic material, before processing and after processing, are described in full detail. Hereto, reference is made to FIG. 11 showing a test equipment 140 for evaluating the flatness of a thermographic material 1, and to FIGS. 12.1–12.3 which are plane views of evaluation templates or gauges used in test equipment 140 for evaluating the flatness of a thermographic material.

Test equipment 140 comprises a plane table 141 (having, e.g., a surface plate in cast iron according to DIN 876), an illumination source 142 (preferably tubular fluorescent lights, partially covered by a black aperture 147 having a long but small opening), an apertured sight 143 (preferably made of a black material, such as a blacked metal), and an arbitrary angle of sight 144.

According to the optical law of Snellius, in air, an incoming beam 145 under an angle of incidence $\alpha$ reflects to an outgoing beam 146 under an angle of refraction $\beta$ being equal to the angle of incidence $\alpha$. However, with regard to FIG. 11, it has to be noted, first that illumination source 142 emits light in a plurality of directions (because of the illumination source being not specular, but rather diffuse), although being restricted to a certain angle by means of aperture 143. Second, thermographic material 1 reflects incident light in a rather diffuse manner, dependent on the specific kind of thermographic material and on its geometrical position (preferably being parallel to the illumination source, and more preferably, both having a horizontal level) and its degree of flatness.

An inspector perceives through apertured sight 143 a reflection of the illumination source 142 caused by thermographic material 1, which is, e.g., a thermographic film, being thermally processed or not processed.

If material 1 has a high flatness, the observed reflection 155 is quite straight or rectilinear. If material 1 has a low flatness, the observed reflection 154 is quite curved; mainly because of local deformations, irregularities, or wrinkles. A curved reflection may touch or even pass some of the reference lines 153, the number of crossed reference lines indicating a numerical evaluation of the perceived flatness of the material 1.

Further, following reference nrs are used: 150 indicating a plane table of high quality (with a width Wt and a length Lt), 151 indicating a template for flatness, 152 indicating holes for air evacuation, 153 indicating reference lines on the template, 154 indicating prohibitive nonflatness of thermographic material 1, and ref. no. 155 indicating thermographic material with acceptable flatness.

Thermographic film 1 has a width Wf and a length Lf, and is preferably positioned either with the length Lf of the thermographic material 1 parallel to the reference lines 153 (see FIG. 12.2 and FIG. 12.3) or with the width Wf of the thermographic material 1 parallel to the reference lines 153.

After bringing a thermographic material 1 on a template 151, one has to wait some time (e.g., 2 min) so that air is free to evacuate between thermographic material and template or table.

Experiments were carried out on unimaged thermographic film coded 'PET 100 CI', comprising clear-base PET-films of 100 $\mu$m thickness, with the dimensions Wf and Lf being 200 mm×300 mm. The heating conditions of a thermal processor according to the present invention were controlled such that the first zone 41 (being "central" to the direction of transportation Y) of each heating element 31 (see FIGS. 2 and 8) reached a temperature of 132.5° C.; and such that each auxiliary heating element 32 (see FIG. 2) reached a temperature of 131.5° C.

Remark that in the present experiments, relating to films with a width Wf substantially smaller than the width of the thermal processor, the second zone 42 and the third zone 43 (both being "a central" to the direction of transportation Y) of each heating element 31 (see FIGS. 2 and 8) were not electrically activated.

The processing speed was regulated at 600 mm/min (equivalent to 10 mm/s). Processing time for the thermographic material was e.g., 38 seconds.

TABLE 1

| | Film 1i ↓ | Film 2i ↓ | Film 3i ↓ | Average |
|---|---|---|---|---|
| Film Fbl | 0 | 0 | 0 | 0 |
| Film Fov | 6 | 7 | >>7 | >6.7 |
| Film Finv | 1 | 2 | 1 | 1.3 |
| Film Fov + inv | 2–3 | 3–4 | 3–4 | 3.3 |

With regard to the above table, film Fb1 comprises blank films 11, 21 and 31, each without any thermal processing; film Fov comprises films 12, 22 and 32, each heated in a conventional oven at 145° C. during 15 min; film Finv comprises films 13, 23 and 33/ each thermally processed according to the present invention; and film Fov+inv comprises films 14, 24 and 34, each being first heated in a conventional oven at 145° C. during 15 min, and thereafter being processed according to the invention.

The above experiment shows that an unimaged thermographic film (of the kind as PET 100 IC) submitted to the heating in a conventional oven with hot air definitely shows a prohibitive nonflatness (see row Fov); a thermographic film thermally processed according to the present invention retains a good flatness (see row Finv); a thermographic film first submitted to the heating in a conventional oven and thereafter being processed according to the present invention returns to an intermediate flatness (see rows Fov and Fov+inv).

From the description of these experiments, it may be clear that in a preferred embodiment of a method according to the present invention, the transporting reaches a flatness of the sheet of thermographic material m such that an observed reflection of an evaluation template (as defined in the above description) on a thermally processed sheet is substantially rectilinear.

(3) Empirical evaluation of optical homogeneity of a processed thermographic material.

Tests for evaluating the homogeneity in density of a thermographic material, before processing and after processing, are described in full detail. Experiments were carried out on uniformly exposed direct-thermographic film Dry View SP829 (commercially available from Eastman Kodak) comprising clear-base PET-films of 100 $\mu$m thickness, with dimensions being 200 mm×300 mm (cf. Wf×Lf). The uniformly exposing took place in a DryView 8700 Laser Imager (to 3M) and was set to result in an optical density of about 1.05 (+/−0.05), which is a density with high perceptibility by the human eye of any density variations.

As described in relation to the foregoing experiment (cf. flatness), the heating conditions in a processor according to the present invention were controlled such that the first zone 41 (being "a central" to the direction of transportation Y) of each heating element 31 (see FIGS. 2 & 8) reached a temperature of 132.5° C.; and such that each auxiliary heating element 32 (see FIG. 2) reached a temperature of 131.5° C.

After thermally processing, the density of the developed film was measured at several places by means of a densitometer Macbeth™ type TR927. A first evaluation focuses on an 'overall homogeneity', whereas a second evaluation focuses on 'local homogeneity'.

After having imaged and having processed quite a lot of thermographic films according to the above mentioned method, on each film the optical density in nine typical spots (e.g., a spot at the "start" or leading edge and at the left side of a film, say in the upper left comer) was measured. Thereafter, in each of these nine spots, the mathematical averaged value of the measured density was noticed.

TABLE 2

| | Left of Wf | Center of Wf | Right of Wf |
|---|---|---|---|
| Start of Lf | 1.07 D | 1.05 D | 1.06 D |
| Middle of Lf | 1.08 D | 1.07 D | 1.07 D |
| End of Lf | 1.08 D | 1.06 D | 1.07 D |

From this experiment, it can be seen clearly that the overall-homogeneity in optical density of a processed thermographic film is within 0.03 D (see optical densities 1.05 D versus 1.08 D).

From the description of these experiments, it may be clear that in a preferred embodiment of a method according to the present invention, the heating of the processing chamber reaches a temperature uniformity of the sheet of thermographic material m such that an overall variation (as defined in the description above) in optical density of a thermally processed sheet is less than 0.03 D. The temperature uniformity of the sheet of thermographic material m is even still more advantageous in case of a further preferred embodiment comprising a heating of the backing means.

In another experiment, the optical density was measured in and around some arbitrary spots. More precisely, first the optical density in an arbitrary spot of the processed thermographic material was measured (say point M), and thereafter optical densities were measured within a circle of radius 20 mm around the point M.

Exemplary results are summarized in the next table:

TABLE 3

| | Left of Wf | Center of Wf | Right of Wf |
|---|---|---|---|
| Start of Lf | 1.09 D | | 1.09 D |
| Middle of Lf | | 1.10 D | |
| End of Lf | 1.10 D | | 1.09 D |

From this experiment, it can be seen clearly that the local homogeneity in optical density of a processed thermographic film is within 0.01 D (see optical densities 1.09 D versus 1.10 D).

From the description of these experiments, it may be clear that in a preferred embodiment a method according to the present invention, the heating of processing chamber reaches a temperature uniformity over the sheet of thermographic material m such that a local variation (as defined in the description above) in optical density on a thermally processed sheet is less than 0.01 D. Again, the temperature uniformity of the sheet of thermographic material m is even still more advantageous in case of a further preferred embodiment comprising a heating of the backing means.

(4) Empirical evaluation of geometrical spread in optical homogeneity of a processed thermographic material.

In the next experiment, a transparent calibration wedge (showing 23 consecutive destiny steps) was first exposed on a film Dry View Blue laser imaging film DVB 98-0439-9816-4 (with dimensions of 430 mm×550 mm) in a same apparatus (DryView 8700 Laser imager). Thereafter, the exposed films were thermally processed in a thermal processor according to the present invention (and regulated at the same conditions, e.g., 131.5° C. and 132.5° C. as described with respect to the foregoing experiments).

Finally, film densities were measured by means of a densitometer Macbeth TR927.

TABLE 4

| Wedge step | Left | Mid | Right | Delta |
|---|---|---|---|---|
| 1 | 0.19 | 0.20 | 0.20 | 0.01 |
| 2 | 0.20 | 0.2 | 0.21 | 0.01 |
| 3 | 0.21 | 0.21 | 0.22 | 0.01 |
| 4 | 0.22 | 0.22 | 0.24 | 0.02 |
| 5 | 0.26 | 0.25 | 0.27 | 0.02 |
| 6 | 0.32 | 0.32 | 0.34 | 0.02 |
| 7 | 0.41 | 0.41 | 0.43 | 0.02 |
| 8 | 0.57 | 0.57 | 0.59 | 0.02 |
| 9 | 0.80 | 0.81 | 0.80 | 0.01 |
| 10 | 1.16 | 1.18 | 1.17 | 0.02 |
| 11 | 1.60 | 1.61 | 1.60 | 0.01 |
| 12 | 2.01 | 2.04 | 2.02 | 0.03 |
| 13 | 2.37 | 2.40 | 2.39 | 0.03 |
| 14 | 2.65 | 2.67 | 2.65 | 0.02 |
| 15 | 2.83 | 2.85 | 2.83 | 0.02 |
| 16 | 2.96 | 2.98 | 2.98 | 0.02 |
| 17 | 3.00 | 3.01 | 2.98 | 0.03 |
| 18 | 3.09 | 3.11 | 3.09 | 0.02 |
| 19 | 3.12 | 3.14 | 3.12 | 0.02 |
| 20 | 3.10 | 3.12 | 3.12 | 0.02 |
| 21 | 3.12 | 3.12 | 3.14 | 0.02 |
| 22 | 3.20 | 3.21 | 3.19 | 0.02 |
| 23 | 3.22 | 3.24 | 3.23 | 0.02 |

From the above experiments, summarized in Table 4, one may conclude that the spread in optical density in a processing according to the present invention may attain 0.01 to 0.03 D, favorable result.

(5) Empirical evaluation of registration monitoring of a processed thermographic material.

In graphics applications, a color-image generally is reproduced using different (3, 4 or more) 'color-selection films' or 'selections' (yellow indicated by Y, magenta indicated by M, cyan indicated C and optionally black indicated by K; see FIGS. 10.1 to 10.3).

High precision registration of the intermediate color-films is an important precondition sine qua non in obtaining a good quality (comprising spatial resolution) color-image printed on a press. The registration of the intermediate color-films themselves is dependent upon the adressability of the imager and upon the dimensional stability of the film.

In a pre-press environment several different methods of registration are used and they vary from application to application. In the present specification, such registration monitoring is used as a quantitative measure of the dimensional stability of the thermographic film after thermal processing.

If the imagesetter has no facilities for punching the film, to achieve registration of the film on the printing press, a film has to be checked before mounting on the press.

This can be carried out using a 'best fit method', explained by way of examples illustrated in FIGS. 10.1 to 10.3. Common to FIGS. 10.1–10.3 is a rectangular diagram that first represents the geometrical dimensions (i.e., width Wf being e.g., 550 mm and length Lf being e.g., 650 mm) of a film 1. Secondly, in each of the four corners of the film, a circular tolerable variation area 79 is indicated (e.g., with a radius of 50 $\mu$m).

Thirdly, each film has a 'registration cross' 75, as imaged in each of the four corners. Thus, in this example, there are in total 3×4=12 registration crosses.

In a best fit registration evaluation, the following steps are carried out (i) all selections are brought together, by laying them one above the other (see FIG. 10.2); (ii) all corresponding registration crosses (e.g., the 'left bottom comer registration cross') of all 3 films are averaged (ref. no. 77); (iii) if at least one of these "averaged registration crosses" falls outside its corresponding circular tolerable variation area, the selections are called 'out of tolerance' and unacceptable for use; if each of these averaged registration crosses" falls inside its corresponding circular tolerable variation area, the selections are called 'within tolerance' and acceptable for use (see FIG. 10.4).

After having executed a plurality of experiments, the registration monitoring of a thermographic material processed according to the present invention confirmed to be very acceptable.

From the description of these experiments, it may be clear that in a preferred embodiment of a method according to the present invention, the heating of the processing chamber reaches a temperature uniformity over the sheet of thermographic material m such that registration crosses fall within a variation area (as defined in the description above) tolerable by four-color printing. The temperature uniformity is even still more advantageous in case of a further preferred embodiment comprising a heating of the backing means.

(v) Further Applicability of the Present Invention

As indicated before, the present invention can be applied advantageously in photothermography. Thermally processable silver-containing materials for producing images by means of imagewise exposing followed by uniform heating are generally known. Details about the composition of such indirect thermophotographic material m may be read in EP 0 810 467 (to Agfa-Gevaert).

From the preceding it also might be clear, that the present invention also can be applied advantageously in direct-thermography and in laserthermography. Details about the composition of such direct thermographic material m may be read in EP 0 692 733 (to Agfa-Gevaert).

In general, from one point of view, the present invention discloses a method for thermal processing or heat developing an imaging element, using a thermal processor according to any one of the embodiments as described in the instant specification.

From another point of view, the present invention discloses a thermal processor 10 for thermal processing a thermographic material 1, enclosing applications in a direct thermography (also including laser-thermography) and in indirect thermography (or photothermography).

The present invention can be used to produce both images in reflection (based, for example, on paper, inter alia, used in the copying sector) and images in transparency (based, for example, on black-and-white or colored film, inter alia, used in medical diagnoses). Applications are encountered both in medical applications (generally with reproduction of a large number of continuous tones) and in graphical applications (generally with high contrast).

Having described in detail preferred embodiments of the current invention, it will now be apparent to those skilled in the art that numerous modifications can be made therein without departing from the scope of the invention as defined in the appending claims.

What is claimed is:

1. A method for thermally processing a sheet of a thermographic material (m), comprising the steps of:

(a) supplying a sheet of a thermographic material having an imaging element ($I_e$) to a thermal processor having a processing chamber;

(b) heating said processing chamber to a predetermined processing temperature ($T_p$);

(c) transporting said sheet through said processing chamber in a sinuous way by transporting means comprising a first belt and a second belt, wherein during said transporting of said sheet through said processing chamber, said first belt is in contact with a first side of said sheet and said second belt is in contact with a second side of said sheet opposite to said first side; and (d) exporting said sheet out of said thermal processor, wherein during said transporting of said sheet through said processing chamber, said sheet contacts said first belt and said second belt in an alternating way so that at any given time a part of said sheet is at most in contact with only one of said first belt and said second belt.

2. The method of claim 1, further comprising the step of supporting each of said first and second belts by at least one backing means.

3. The method of claim 2, further comprising the step of heating said backing means.

4. The method of claim 1, further comprising the steps of sensing a presence of said thermographic material in said thermal processor, and activating a heating element such that a temperature of each of said first belt and said second belt is controlled within a working range.

5. The method of claim 1 wherein said heating reaches a temperature uniformity over said sheet of thermographic material (m) such that a local variation in optical density on a thermally processed sheet is less than 0.01 D.

* * * * *